Patented Feb. 23, 1937

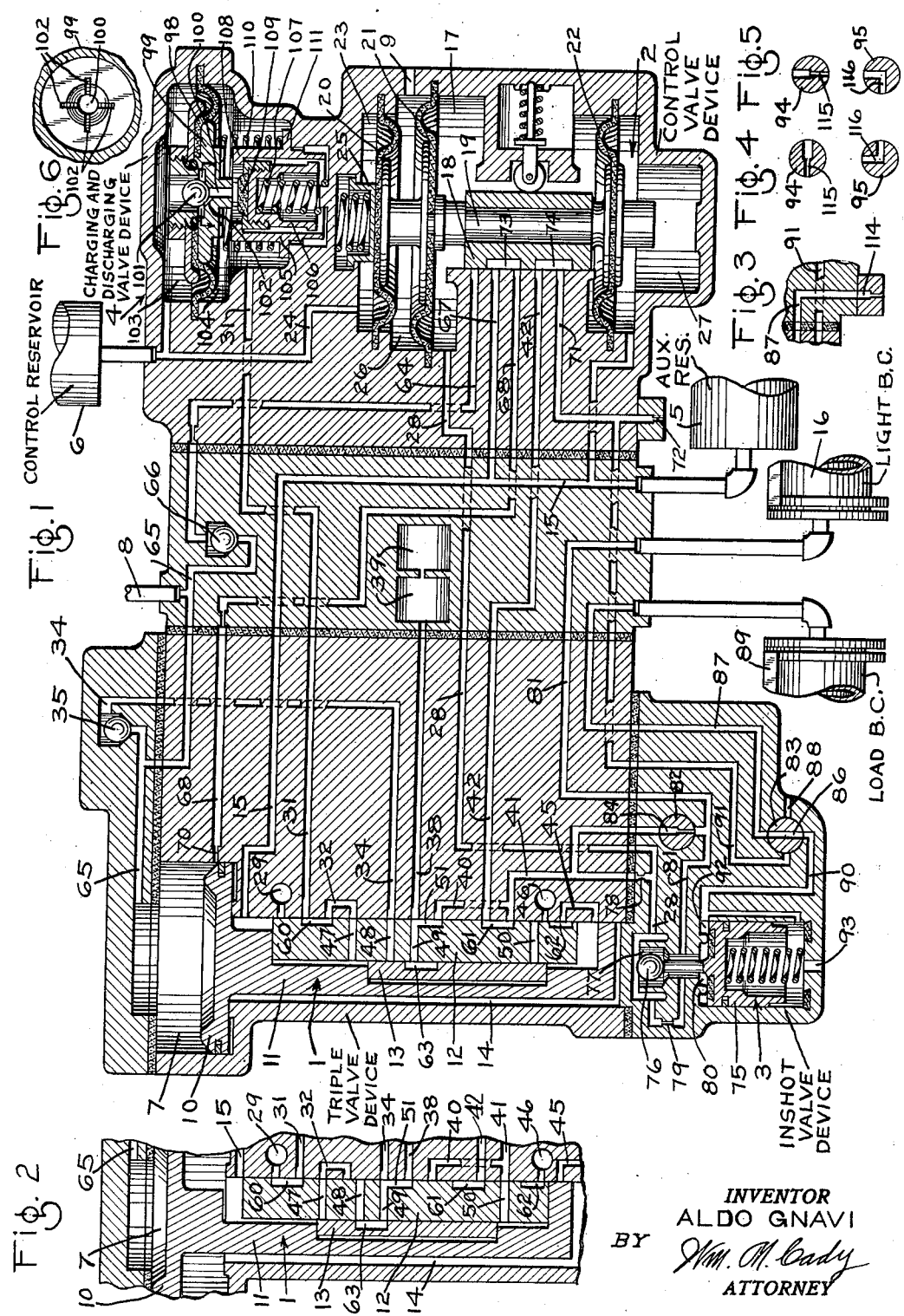

2,071,741

UNITED STATES PATENT OFFICE 2,071,741

FLUID PRESSURE BRAKE

Aldo Gnavi, Turin, Italy, assignor to The Westinghouse Air Brake Company, Wilmerding, Pa., a corporation of Pennsylvania Application August 18, 1933, Serial No. 685,732
In Italy December 16, 1932

14 Claims. (Cl. 303—60)

This invention relates to fluid pressure braking systems of the kind in which the supply of fluid under pressure to and from the brake cylinder is arranged to be effected in response to variations in brake pipe pressure. More particularly the invention relates to braking systems comprising a tripple or other form of controlling or distributing valve embodying a control reservoir or chamber containing fluid under pressure which is arranged to cooperate with the pressures obtaining in the brake pipe and brake cylinder for the purpose of enabling a graduated application or release of the brakes to be effected.

The invention has for its object to provide certain improvements in braking systems of this character and in order that the nature of the invention may be clearly understood one form of braking system embodying the improvements of the invention will now be described by way of example with reference to the figure of the accompanying drawing of which Figure 1 is a diagrammatic view, mainly in section, of the braking equipment provided upon a single vehicle, and adapted to effect different degrees of braking in accordance with the load on the vehicle, the parts of the equipment being shown in their normal running position.

Figure 2 is a detail view of a portion of the equipment shown in Figure 1, showing the positions occupied by certain parts thereof when an application of the brakes is being effected. Figure 3 is a detail view of a portion of the equipment of Figure 1 as modified for passenger or other service, in which a variation of the braking in accordance with the load on the vehicle is not required. Figures 4 and 5 are detail views of modified plug cocks forming part of the equipment of Figure 1 and illustrating the communications established thereby under different running conditions. Figure 6 is a section on the line 6—6 of Figure 1.

Referring now first to Figure 1, it will be seen that the braking equipment illustrated comprises a triple valve device 1, a control valve device 2, a quick-inshot valve device 3, a charging and discharging valve device 4, an auxiliary reservoir 5 and a control reservoir 6.

The triple valve device 1 comprises a casing having a piston chamber 7 which is connected to the brake pipe 8 through a passage 65. The piston chamber 7 contains a piston 10 having a stem 11 adapted to operate a main slide valve 12 and an auxiliary or graduating valve 13 contained in a valve chamber 14 which communicates with the auxiliary reservoir 5 through a passage 15. The control valve device 2 comprises a casing having a valve chamber 17 containing a slide valve 18 operated by a stem 19 which is connected to three spaced flexible diaphragms 20, 21 and 22 secured in the casing of the valve device 2, the diaphragm 22 being smaller than the diaphragm 21.

A chamber 23 above the diaphragm 20 is in communication, by means of a passage 24, with the control reservoir 6 and contains a spring controlled stop 25, the chamber 26 between the diaphragms 20 and 21 being in open communication with the atmosphere through port 9. The chamber 27 below the diaphragm 22 communicates with the passage 15 leading to the auxiliary reservoir 5 and the valve chamber 17 between the diaphragms 21 and 22 communicates with a passage 28 leading to the quick-inshot valve device 3.

The valve seat of the slide valve 12 is provided with an atmospheric port 29, passage 31, a pair of connected ports 32, a passage 34 containing a non-return ball valve 35, the passage 34 communicating past the check valve 35 with the brake pipe passage 65.

The valve seat is also provided with a passage 38 leading to a pair of quick service bulbs or chambers 39 which are in restricted communication with one another, a port 40 communicating with a passage 41, a passage 42 leading to the seat of the slide valve 18 of the control valve device 2, a pair of connected ports 45 and a second atmospheric port 46. The main slide valve 12 is provided with ports 47, 48, 49 and 50, a cavity 51 communicating with the port 49 and cavities 60, 61 and 62, the graduating valve 13 being provided with a cavity 63.

Leading to the seat of slide valve 18 is passage 64, which communicates by way of the non-return ball valve 66 and passage 65 with piston chamber 7; passage 67, leading to passage 15; passage 68, leading to a restricted port 70 which opens into piston chamber 7; a passage 42, leading to the seat of slide valve 12; and a passage 71, leading to a restricted atmospheric exhaust port 72.

The slide valve 18 is provided with two cavities indicated at 73 and 74 respectively.

The quick-inshot valve device 3 is of the well known construction comprising a spring contolled piston 75 adapted to operate a ball valve 76 contained in a chamber 77 which communicates through a restriction 78 with the passage 41. The chamber 77 is also in open communication with the passage 28 and communicates through a restriction 79 with the inner space 80 above the piston 75, the space 80 also communicating with a passage 81 leading to the empty or light load brake cylinder 16.

The valve device 3 has associated therewith two plug cocks 82 and 83, which are respectively positioned for a load condition in the manner shown in the figure, the cock 82 having a restricted port 84 of suitable design, for connecting passage 41 in the triple valve device with the passage 81, and the cock 83 having a port 86 of suitable design for connecting passage 90 with passage 87 leading to the load brake cylinder 89.

For an empty or light load condition, plug cocks 82 and 83 are respectively adjusted to positions in which the former closes the connection therethrough between passage 41 and passage 81 leading to the light load brake cylinder 16, and in which the port 86 of the latter connects passage 91 with an atmospheric exhaust port or passage 88.

The space 92 is in communication with an atmospheric outlet 93, when the piston 75 is in its upper position as shown in the figure, and also it is in communication with load brake cylinder 89 through passage 90, port 86 of the plug cock 83, and passage 87, when the cock 83 is adjusted for load condition as above explained.

The charging and discharging valve device 4 comprises a flexible diaphragm 98 having a valve seat member 99 secured thereto which is provided with a wide port 100 having a ball valve 101 mounted thereon and restricted ports 102. The chamber 103 above the diaphragm 98 is in open communication with the control reservoir 6 and the chamber 104 below the diaphragm communicates with the passage 31. The chamber 104 contains a valve cage 105 within which is mounted a valve member 106 subject to the pressure of a spring 107, the cage 105 having an annular flange 108 adapted to limit the movement of the valve member 106 in one direction, the member 106 carrying a gasket 109 adapted to engage with the seat member 99 to close the port 100. A light spring 110 is interposed between the seat member 99 and a flange 111 on the valve cage 105 so that so long as the pressures in the chambers 103 and 104 are substantially equal the seat member 99 is maintained out of engagement with the gasket 109 to open the port 100.

The operation of the braking equipment is as follows:

In initially charging the system, fluid under pressure from the brake pipe 8 flows to the piston chamber 7 of the triple valve device 1 and thence through port 70, passage 68, cavity 73 in the slide valve 18 of control valve device 2, passages 67 and 15 to the chamber 27 and to auxiliary reservoir 5 which are thus charged to the normal brake pipe pressure. Fluid also flows from passage 15 to the valve chamber 14 of the triple valve device 1 and thence through port 47 in the slide valve 12, ports 32, cavity 60, and passage 31 to the chamber 104 of the valve device 4. From this chamber fluid flows through port 100, past the ball valve 101 to chamber 103, and thence to the control reservoir 6 and, by way of passage 24, to the chamber 23 of the valve device 2.

Assuming that the equipment is adjusted for load braking, that is to say, that the plug cocks 82 and 83 occupy the positions shown in Figure 1, the empty brake cylinder 16 will be in communication with the atmosphere by way of passage 81, port 84 in the plug cock 82, passage 41, cavity 61, passage 42, cavity 74, passage 71 and exhaust port 72.

The load brake cylinder is in communication with the atmosphere by way of passage 87, port 86 in the plug cock 83, passage 90 and exhaust port 93 in the valve device 3.

The chamber 17 of the valve device 2 is also in communication with the atmosphere by way of passage 28, restriction 78 and passages 41, 42, and 71.

In order to effect an application of the brakes, either under empty or load conditions, the brake pipe pressure is reduced in the usual manner and the piston 10 of the triple valve device moves towards its service application position shown in Figure 2. At the beginning of this movement the port 70 is covered by the piston 10 and the movement of the graduating valve 13 establishes communication between the brake pipe and the bulb 39 by way of passage 34, port 48, cavity 63, port 49, and passage 38, thus effecting the usual quick service action.

In the application position of the triple valve device 1, fluid under pressure is supplied from the auxiliary reservoir 5 to the empty brake cylinder 16 by way of valve chamber 14, port 50, passage 41, restriction 78, passage 28, chamber 77, past open ball valve 76 to passage 81, fluid also flowing from passage 41 to passage 81 through the plug cock 82.

As soon as a predetermined pressure in the empty brake cylinder is attained, the valve device 3 operates in the usual manner to permit the valve 76 to close and thereafter fluid is supplied to the empty brake cylinder through the restriction 79 and the restricted port 84 of plug cock 82. This operation of the valve device 3 also effects the supply of fluid under pressure to the load brake cylinder by way of the outer space 92, passage 90, through port 86 in plug cock 83, and passage 87.

Under empty or light load conditions, there is no flow of fluid through restricted passage 84 of plug cock 82, because of the cock being in a closed position. Furthermore, under empty or light load conditions, no fluid is supplied to load cylinder 89 from the space 92 above piston 75, after exhaust port 93 is closed by piston 75 moving downwardly, due to plug cock 83 being turned to a position in quadrature to that shown in Figure 1.

As above stated, so long as the triple valve device 1 occupies its running position the chamber 104 of the charging and discharging valve device 4 is in communication with the valve chamber 14 of the triple valve device 1 and is consequently maintained at the normal auxiliary reservoir pressure. The diaphragm 98 is consequently maintained in its upper position under the action of the spring 110 so that open communication is established between the chamber 104 and the chamber 103.

As soon, however, as the slide valve 12 of the triple valve device 1 attains its application position shown in Figure 2, communication is established between the chamber 104 and the atmosphere through passage 31, cavity 60 and port 29. Fluid under pressure is thus immediately released from the chamber 104 and the diaphragm 98 is consequently promptly and positively moved downwards under the action of the control reservoir pressure in the chamber 103, thereby causing the seat member 99 to engage with the gasket 109 to close port 100 and thus isolate the chamber 103 and the control reservoir 6.

The pressure established in the brake cylinder is transmitted to chamber 17 of the valve device 2 through passage 28. During a braking application it will be seen that the pressure in the chamber 17 is increasing and the pressure in the chamber 27, which is in communication with the auxiliary reservoir 5, is decreasing, both these pressures tending to move the diaphragms of the control device 2 upwards in opposition to the control reservoir pressure in the chamber 23.

The effective areas of the diaphragms 20, 21 and 22 are so proportioned that so long as the decrease in the auxiliary reservoir pressure bears a predetermined relation to the increase in the brake cylinder pressure, the diaphragms and slide valve of the control device 2 remain in the position shown in Figure 1.

The relation above referred to and the capacity of the auxiliary reservoir employed is preferably such that when the empty brake cylinder 16 only is operative as in the case of an empty or lightly loaded vehicle, the slide valve 18 of the control valve device 2 is maintained in the position shown so that the brake cylinder is supplied with fluid under pressure solely from the auxiliary reservoir 5 as above explained.

When, however, both the empty and load brake cylinders are operative the rate of increase of pressure in the brake cylinders and in the chamber 17 of the control valve device 2 bears a different relation to the rate of decrease of pressure in the auxiliary reservoir 5 and in the chamber 27 so that the diaphragms 20, 21 and 22 and the slide valve 18 are moved downwards to uncover the passage 64, due to the fact that the pressure of fluid on diaphragm 20 in chamber 23 and supplied from the control reservoir 6 exerts a downward force on slide valve operating stem 19, which force overcomes the upward opposing force exerted by the brake cylinder and auxiliary reservoir pressures in chambers 17 and 27 respectively. Fluid under pressure is thereupon supplied to the brake cylinders from the brake pipe by way of passage 65 past the ball check valve 66, and passage 64.

When the fluid pressure in the brake cylinders has increased sufficiently, the upward force exerted by the brake cylinder pressure in chamber 17 sufficiently counteracts the downward force exerted by control reservoir pressure and as a result slide valve 18 is returned to its normal position in which passage 64 is lapped, as shown in the figure.

As soon as the pressure in the auxiliary reservoir 5 has fallen slightly below the reduced brake pipe pressure the piston 10 of the triple valve device 1 returns to its service lap position in which the port 50 is covered by the graduating valve 13 so that the further supply of fluid from the auxiliary reservoir 5 and valve chamber 14 to the brake cylinder passage 41 is cut off.

In the event of the brake cylinder pressure thus established becoming reduced for any reason, as for instance owing to leakage, the pressure in the chamber 17 of the valve device 2 will be correspondingly reduced and the diaphragms 20, 21 and 22 and the slide valve 18 will be moved downwards to uncover the passage 64. Fluid from the brake pipe will thereupon be supplied to the chamber 17 and to the brake cylinders from the brake pipe by way of passage 64 past the ball valve 66. As soon as the brake cylinder pressure has been thus restored the valve device 2 will return to its normal position as shown and will cut off the supply of fluid from the brake pipe owing to the slide valve 18 lapping the passage 64.

It will be evident that the ball valve 66 prevents the flow of fluid from the brake cylinders to the brake pipe which would otherwise occur in the event of the brake pipe becoming completely vented due to fracture or an emergency application of the brakes.

In order to obtain a graduated release of the brakes the brake pipe pressure is restored towards its normal value in the usual manner with the result that the piston 10 of the triple valve device 1 returns to the position shown in Figure 1.

During the initial movement of the slide valve 12 from the service application position shown in Figure 2, the cavity 62 connects the port 45 to the exhaust port 46 with the result that fluid is temporarily vented from the valve chamber 14 thus assisting the continuance of the movement of the piston 10 towards its release position. In this latter position, the port 46 is lapped, as shown in Figure 1, so that the further release of fluid therethrough from the valve chamber 14 is cut off.

Fluid under pressure is now vented from the brake cylinder through passage 81, plug cock 82, passage 41, cavity 61, passage 42, cavity 74 in the valve device 2, passage 71 and exhaust outlet 72.

The auxiliary reservoir 5 is at the same time recharged through port 70 in the triple valve device 1, passage 68, cavity 73 in slide valve 18, passage 67 and passage 15.

As soon as the brake cylinder pressure in the chamber 17 of the valve device 2 has been thus reduced to a value below that corresponding to the increased auxiliary reservoir pressure in the chamber 27, the slide valve 18 will be moved downward to lap the passage 42 and thus to cut off further release of fluid from the brake cylinders.

A further increase in the brake pipe pressure towards its normal value will effect a further release of fluid from the brake cylinder in a similar manner.

The control valve device 2 also operates during the release of the brakes to control the rate at which fluid is released from the brake cylinders relative to the rate of recharge of the auxiliary reservoir 5. If the auxiliary reservoir 5 tends to be recharged at a higher rate than that corresponding to the rate at which fluid under pressure is vented from the brake cylinders as determined by the exhaust outlet 72, which circumstance may occur on vehicles at the head end of the train, the diaphragms 20, 21, 22 and the slide valve 18 will be moved upwards against the action of the spring stop 25 so as to lap or to restrict passage 68 and thus interrupt or reduce the flow of fluid to the auxiliary reservoir 5.

Conversely if for any reason the rate of release of fluid from the brake cylinders is too high relative to the rate of recharge of the auxiliary reservoir 5 the slide valve 18 will be moved downwards to lap or to restrict the passage 42 and thus to interrupt or to reduce the rate of flow of fluid from the brake cylinders to the exhaust outlet 72.

Under certain conditions, as for instance when the train is approaching a long steep grade on the track, it is desirable to increase the normal pressure of the braking system, and this may be effected by increasing the brake pipe pressure to the desired abnormal value. This increased brake pipe pressure is transmitted to the several parts of the system in the same manner as that already described when initially charging the system and in particular it will be noted that the control reservoir 6 is charged to the higher pressure by the free flow of fluid through the wide port 100 past the ball valve 101 in the charging and discharging valve device 4. The control reservoir 6 is thus rapidly charged to the desired abnormal pressure and the braking equipment subsequently operates in the manner already described when effecting an application and release of the brakes.

In order to restore the system to its normal running pressure the brake pipe pressure is gradually reduced to its normal value and fluid thereupon flows from the control reservoir 6 and the chamber 103 of the valve device 4 through the restricted ports 102 to the chamber 104 and thence by way of passage 31 to the valve chamber 14, the pressure in valve chamber 14 and in auxiliary reservoir 5 being reduced simultaneously in accordance with the reduction in brake pipe pressure by flow of fluid under pressure therefrom to the brake pipe through passages 15 and 67, cavity 73 in slide valve 18, passage 68, port 70, piston chamber 7, and passage 65. The pressure in the control reservoir 6 is thus slowly reduced to the normal value and the system then operates as above described.

The valve equipment above described may be employed on single capacity cars which are operated at times in passenger service where it is generally desired to apply and release the brakes at a faster rate than in load brake operation. To adapt the valve equipment to this type of single capacity service, the plug cocks 82 and 83 are removed, and replaced respectively by plug cocks 94 and 95, shown in Figure 4, and the end of passage 87 is provided with an exhaust outlet 114 of suitable design, as shown in Figure 3.

The plug cock 94 is provided with a restricted passage 115, which is similar in appearance to passage 84 of plug cock 82 but which possesses design characteristics differing from those of passage 84. Plug cock 94 is illustrative of a cock for effecting suitable operation of the equipment where brake cylinder capacity and other conditions vary from those in accordance with which plug cock 82 is designed. Plug cock 95 is provided with a passage 116, for establishing different connections than those possible with plug cock 83, as will be hereinafter made clear.

In freight service, where the cars are not equipped for brake adjustment in accordance with the load, plug cocks 94 and 95 are respectively adjusted to the positions shown in Figure 4, wherein the connection is closed through cock 94 from passage 41 to passage 81 leading to the brake cylinder 16, and wherein the cock 95 connects passage 87 to exhaust port 88. In such case, therefore, the equipment operates substantially as above explained for an empty or light load. It is to be noted that exhaust outlet 114 is inoperative, at this time, as it is connected through passage 87 and passage 116 of plug cock 95 to the atmospheric exhaust port 88.

When it is desired to employ a car equipped as above, in passenger service, the plug cocks 94 and 95 are adjusted into their respective positions, shown in Figure 5, wherein, passage 115 of cock 94 connects passage 41 to passage 81 leading to the light load brake cylinder 16, and wherein passage 116 connects passage 91 to passage 37 leading to outlet 114. Thus the rate of flow of fluid to the brake cylinder on brake application is augmented to a desired degree for passenger service by opening the passage 115; and the rate of flow of fluid from the brake cylinder on brake release is also increased a desired degree, due to the fact that brake cylinder exhaust is effected through exhaust ports 72 and 114 in parallel instead of from only port 72.

The invention is evidently not limited to the particular construction and arrangement of braking equipment above described and illustrated by way of example which may be varied in many respects without exceeding the scope of the invention.

Having now described my invention, what I claim as new and desire to secure by Letters Patent, is:

1. In a fluid pressure brake, the combination with a normally charged reservoir, a brake cylinder, means operative to cause fluid under pressure to be supplied to the brake cylinder from the reservoir to effect an application of the brakes, a normally charged control reservoir, and valve mechanism subject to the pressure of fluid in said control reservoir for controlling the supply of fluid under pressure to the brake cylinder, of means providing a communication through which fluid under pressure may flow into or out of the said control reservoir, a valve operative to cause the rate of flow of fluid under pressure out of the control reservoir through the said communication to be less than the rate of flow of fluid under pressure through the said communication into the said control reservoir, and means operative upon an application of the brakes for closing the said communication.

2. In a fluid pressure brake, the combination with a normally charged reservoir and a brake cylinder adapted to be supplied with fluid under pressure from said reservoir to effect an application of the brakes, a normally charged control reservoir, and valve mechanism subject to the pressure of fluid in said control reservoir for controlling the supply of fluid under pressure to the brake cylinder, of a movable abutment having a passage therethrough through which fluid under pressure is supplied to and released from the control reservoir, said abutment being subject to fluid under pressure on one side thereof and moved to open and close said passage in response to variations in the pressure of the fluid at the said one side of the abutment, and a valve, carried by said abutment, adapted to prevent back flow of fluid under pressure through the said passage from the control reservoir except at a restricted rate.

3. In a fluid pressure brake, the combination with a brake pipe, an auxiliary reservoir, a brake cylinder, a brake controlling valve device operated upon an increase in brake pipe pressure to effect the release of fluid under pressure from said brake cylinder to thereby release the brakes, and upon a reduction in brake pipe pressure at a predetermined rate to effect the supply of fluid under pressure from said auxiliary reservoir to said brake cylinder to effect an application of the brakes, a control reservoir, and a valve mechanism controlled by auxiliary reservoir pressure, brake cylinder pressure and control reservoir pressure for controlling the supply of fluid to the brake cylinder, of means adapted to permit flow of fluid under pressure to the control reservoir at a certain rate upon an increase in brake pipe pressure and to prevent back flow of fluid under pressure from the control reservoir except at a rate slower than said certain rate upon a reduction in brake pipe pressure at a rate less than said predetermined rate, and means operable to prevent back flow of fluid under pressure from the control reservoir upon a reduction in brake pipe pressure at a rate at least equal to said predetermined rate.

4. In a fluid pressure brake, the combination with a brake pipe, an auxiliary reservoir, a brake cylinder, a brake controlling valve device operated upon an increase in brake pipe pressure to effect the release of fluid under pressure from said brake cylinder to thereby release the brakes, and upon a reduction in brake pipe pressure at a predetermined rate to effect the supply of fluid under pressure from said auxiliary reservoir to said brake cylinder to effect an application of the brakes, a control reservoir, and a valve mechanism controlled by auxiliary reservoir pressure, brake cylinder pressure and control reservoir pressure for controlling the supply of fluid to the brake cylinder, of a movable abutment adapted to establish a communication through which fluid under pressure is supplied to the control reservoir, upon an increase in brake pipe pressure, and through which fluid under pressure is released from the control reservoir, as long as the rate of brake pipe pressure reduction does not equal or exceed the said predetermined rate, and a valve operable to prevent back flow of fluid under pressure from the control reservoir through said communication except at a restricted rate.

5. In a fluid pressure brake, the combination with a brake pipe, a brake cylinder, an auxiliary reservoir and a brake controlling valve device operated upon an increase in brake pipe pressure to establish a communication through which fluid under pressure is supplied from the brake pipe to the auxiliary reservoir and a communication through which fluid under pressure is released from the brake cylinder, and operated upon a reduction in brake pipe pressure to establish a communication through which fluid under pressure is supplied from the auxiliary reservoir to the brake cylinder, of a control valve device subject to the opposing pressures of the brake cylinder and auxiliary reservoir and operative upon an increase in brake pipe pressure to control the communication through which fluid under pressure is supplied from the brake pipe to the auxiliary reservoir and the communication through which fluid under pressure is released from the brake cylinder and operative upon a reduction in brake pipe pressure to control a communication through which fluid under pressure is supplied from the brake pipe to the brake cylinder.

6. In a fluid pressure brake, the combination with a brake pipe, a brake cylinder, an auxiliary reservoir, and a brake controlling valve device movable upon an increase in brake pipe pressure to release position wherein a communication is established through which fluid under pressure is supplied from the brake pipe to the auxiliary reservoir to charge the latter, and a communication is established through which fluid under pressure is vented from the brake cylinder, and movable upon a reduction in brake pipe pressure to a position wherein the communication through which fluid under pressure is vented from the brake cylinder is closed and a communication is established through which fluid under pressure is supplied from the auxiliary reservoir to the brake cylinder to effect an application of the brakes, of a control valve device subject to the pressures of the auxiliary reservoir and the brake cylinder, said control valve device being operative, when the brake controlling valve device is in release position, to control the communication through which fluid under pressure is supplied to the auxiliary reservoir and the communication through which fluid under pressure is vented from the brake cylinder, and operative, when the brake controlling valve device is in the said position for effecting an application of the brakes, to control a communication through which fluid under pressure may be supplied from the brake pipe to the brake cylinder.

7. In a fluid pressure brake, the combination with a brake pipe, a brake cylinder, an auxiliary reservoir, and a brake controlling valve device operative upon an increase in brake pipe pressure to establish a communication through which fluid under pressure is supplied from the brake pipe to the auxiliary reservoir, and upon a reduction in brake pipe pressure to establish a communication through which fluid under pressure is supplied from the auxiliary reservoir to the brake cylinder to effect an application of the brakes, of a control valve device, subject to the opposing pressures of the brake cylinder and the auxiliary reservoir, operative upon an increase in brake pipe pressure to control the communication through which fluid under pressure is supplied from the brake pipe to the auxiliary reservoir and upon a reduction in brake pipe pressure to control a communication through which fluid under pressure is supplied from the brake pipe to the brake cylinder.

8. In a fluid pressure brake, the combination with a brake pipe, a brake cylinder, an auxiliary reservoir, and a brake controlling valve device movable, upon an increase in brake pipe pressure, to release position wherein a communication is established through which fluid under pressure is supplied from the brake pipe to the auxiliary reservoir to charge the latter, and movable, upon a reduction in brake pipe pressure, to a position wherein the said communication from the brake pipe to the auxiliary reservoir is closed and a communication is established through which fluid under pressure is supplied from the auxiliary reservoir to the brake cylinder to effect an application of the brakes, of a control valve device subject to the pressures of the auxiliary reservoir and the brake cylinder, said control valve device being operative, when the said brake controlling valve device is in release position, to control the said communication through which fluid under pressure is supplied from the brake pipe to the auxiliary reservoir, and operative when the brake controlling valve device is in said position for effecting an application of the brakes, to control a communication through which fluid under pressure may be supplied from the brake pipe to the brake cylinder.

9. In a fluid pressure brake, the combination with a brake pipe, an auxiliary reservoir, a pair of brake cylinders, means for cutting one of said brake cylinders in and out of operation, and a brake controlling valve device operated upon a reduction in brake pipe pressure to cause fluid under pressure to be supplied from said auxiliary reservoir to one or both of said brake cylinders, depending upon whether one or both are cut in for operation, to effect an application of the brakes, of a control valve device operatively controlled by the pressure of fluid in the auxiliary reservoir and in one or both said brake cylinders, said control device being operated upon an application of the brakes, when controlled by the pressure of fluid in both brake cylinders and in the auxiliary reservoir, to establish a communication through which fluid under pressure is supplied to the brake cylinders to augment the supply of fluid under pressure to the brake cylinders from the auxiliary reservoir and effective upon an application of the brakes, when controlled by the pressure of the fluid in only one brake cylinder and in the auxiliary reservoir to maintain said communication closed.

10. In a fluid pressure brake, the combination with a brake pipe, an auxiliary reservoir, a pair of brake cylinders, means for cutting one of said brake cylinders in and out of operation, and a brake controlling valve device operated upon a reduction in brake pipe pressure to cause fluid under pressure to be supplied from said auxiliary reservoir to one or both of said brake cylinders, depending upon whether one or both are cut in for operation, to effect an application of the brakes, of a control valve device controlled by the pressure of fluid in the auxiliary reservoir and in one or both said brake cylinders, said control valve device being non-operative in response to the normal variations in brake cylinder and auxiliary reservoir pressures upon an application of the brakes when only one of said brake cylinders is in operation, and operative in response to the normal variations in brake cylinder and auxiliary reservoir pressures upon an application of the brakes when both of said brake cylinders are in operation, to open a communication through which fluid under pressure is supplied to the brake cylinders to augment the pressure of the fluid supplied to the brake cylinders from the auxiliary reservoir.

11. In a fluid pressure brake, the combination with a brake pipe, an auxiliary reservoir, a pair of brake cylinders, means for cutting one of said brake cylinders in and out of operation, and a brake controlling valve device operated upon a reduction in brake pipe pressure to cause fluid under pressure to be supplied from said auxiliary reservoir to one or both of said brake cylinders, depending upon whether one or both are cut in for operation, to effect an application of the brakes, of a control valve device controlled by the pressure of fluid in the auxiliary reservoir and in one or both said brake cylinders, said control valve device being non-operative in response to the normal variations in brake cylinder and auxiliary reservoir pressures upon an application of the brakes when only one of said brake cylinders is in operation, and operative in response to the normal variations in brake cylinder and auxiliary reservoir pressures upon an application of the brakes when both of said brake cylinders are in operation, to open a communication through which fluid under pressure is supplied from the brake pipe to the brake cylinders to augment the pressure of the fluid supplied to the brake cylinders from the auxiliary reservoir.

12. In a fluid pressure brake, the combination with a brake pipe, an auxiliary reservoir, a brake cylinder, a brake controlling valve device operated upon an increase in brake pipe pressure to effect the release of fluid under pressure from said brake cylinder to release the brakes, and upon a reduction in brake pipe pressure to effect the supply of fluid under pressure from said auxiliary reservoir to said brake cylinder to apply the brakes, a control reservoir, and a valve mechanism controlled by auxiliary reservoir pressure, brake cylinder pressure, and control reservoir pressure for controlling the pressure of fluid in the brake cylinder, of a valve for controlling a communication through which fluid under pressure is supplied to and released from the control reservoir, a movable abutment, subject on one side to control reservoir pressure and on the other side to fluid at a pressure corresponding to that in the brake pipe, for operating said valve, said brake controlling valve device being adapted upon an increase in brake pipe pressure to establish a communication through which fluid under pressure is supplied to the said other side of said abutment to cause it to operate said valve to open said communication leading to the control reservoir and adapted upon a reduction in brake pipe pressure to establish a communication through which fluid under pressure is vented to atmosphere from said other side of said abutment to cause said abutment to operate said valve to close said communication leading to the control reservoir.

13. In a fluid pressure brake, the combination with a brake pipe, an auxiliary reservoir, a pair of brake cylinders, means for cutting one of said brake cylinders in and out of operation, and a brake controlling valve device operated upon a reduction in brake pipe pressure to cause fluid under pressure to be supplied from said auxiliary reservoir to one or both of said brake cylinders, depending upon whether one or both are cut in for operation, to effect an application of the brakes, of a control valve device operatively controlled by the pressure of fluid in the auxiliary reservoir and in one or both said brake cylinders, said control device being operated upon an application of the brakes, when controlled by the pressure of fluid in both brake cylinders and in the auxiliary reservoir, to establish a communication through which fluid under pressure is supplied to the brake cylinders to augment the supply of fluid under pressure to the brake cylinders from the auxiliary reservoir and effective upon an application of the brakes, when controlled by the pressure of the fluid in only one brake cylinder and in the auxiliary reservoir to maintain said communication closed, said control device being operated also to open the said communication to cause fluid under pressure to be supplied to one or to both of said brake cylinders, depending upon whether one or both of the brake cylinders are cut in for operation, in the event of reduction in brake cylinder pressure by undesired leakage, for maintaining the brake cylinder pressure against leakage.

14. In a fluid pressure brake, the combination with a brake pipe, an auxiliary reservoir, a pair of brake cylinders, means for cutting one of said brake cylinders in and out of operation, and a brake controlling valve device operated upon a reduction in brake pipe pressure to cause fluid under pressure to be supplied from said auxiliary reservoir to one or both of said brake cylinders, depending upon whether one or both are cut in for operation, to effect an application of the brakes, of a control valve device operatively controlled by the pressure of fluid in the auxiliary reservoir and in one or both said brake cylinders, said control device being operated upon an application of the brakes, when controlled by the pressure of fluid in both brake cylinders and in the auxiliary reservoir, to establish a communication through which fluid under pressure is supplied to the brake cylinders to augment the supply of fluid under pressure to the brake cylinders from the auxiliary reservoir and effective upon an application of the brakes, when controlled by the pressure of the fluid in only one brake cylinder and in the auxiliary reservoir to maintain said communication closed, and means for preventing reflux of fluid under pressure through the said communication from the brake cylinders.

ALDO GNAVI.